United States Patent [19]

Anderson et al.

[11] 4,038,061

[45] July 26, 1977

[54] AIR CONDITIONER CONTROL

[75] Inventors: Richard M. Anderson, Smyrna; Robert S. McGill, III, Murfreesboro; Robert W. Ramsey, Nashville, all of Tenn.

[73] Assignee: Heil-Quaker Corporation, Lewisburg, Tenn.

[21] Appl. No.: 645,281

[22] Filed: Dec. 29, 1975

[51] Int. Cl.$^2$ .................. H02K 7/10; F25B 49/00
[52] U.S. Cl. ................................ 62/126; 361/22
[58] Field of Search ............ 317/36 TD, 13 R, 13 A; 62/126, 129, 158, 230; 318/490

[56] References Cited

U.S. PATENT DOCUMENTS

| | | | |
|---|---|---|---|
| 3,628,346 | 12/1971 | LaGrone, Jr. | 62/126 |
| 3,796,892 | 3/1974 | Stewart | 62/158 X |
| 3,919,600 | 11/1975 | Sons | 317/13 R |
| 3,946,574 | 3/1976 | Portera | 62/158 |

Primary Examiner—William E. Wayner
Attorney, Agent, or Firm—Wegner, Stellman, McCord, Wiles & Wood

[57] ABSTRACT

A control system for a central air conditioner. The air conditioner includes an outdoor condensing unit including a refrigerant compressor, an indoor evaporator unit, an indoor thermostat responsive to the indoor temperature for controlling the air conditioner, and a control system for protecting the air conditioner and indicating to the user certain malfunctions in the air conditioner should they occur. The malfunction indication may be by means of signal lights and a manually operable reset control is provided permitting the user to reset the control system. The malfunction indicator and reset control are disposed adjacent the thermostat for facilitated determination of the system operating condition. The control system includes an improved control position for starting of the compressor motor which is arranged to prevent operation of the system in the event of a low power supply voltage condition. The control system provides a minimum "Off" reset time before permitting the air conditioner to automatically attempt to restart regardless of the condition causing stopping of the air conditioner. The control system further includes a current sensing control which determines the compressor motor current a preselected time after the closing of the compressor motor switch and is arranged to discontinue operation of the compressor motor in the event the current is above a preselected high value. Clock pulses are used to facilitate operation of the current sensing control. Improved accuracy in the timing of the control system is obtained by means of coordinated use of clock pulses and R-C time delays.

17 Claims, 6 Drawing Figures

AIR CONDITIONER CONTROL

BACKGROUND OF THE INVENTION

1. Field of the Invention

This invention relates to air conditioners and in particular to means for controlling the operation of air conditioners, such as central air conditioners, having outdoor condenser and compressor units and indoor evaporator and thermostatic control units.

2. Description of the Prior Art

Central air conditioners conventionally employ outdoor condenser and refrigerant compressor units which are connected to indoor evaporator units and controls by suitable ducts and wiring for providing relatively high capacity indoor air conditioning. Such systems utilize thermostatic controls which conventionally incorporate manually adjustable means for selecting a desired indoor temperature and automatically controlling the operation of the system to obtain such temperature.

At times, such air conditioning systems may become inoperative for any one of a number of different reasons. Illustratively, the system may be shut down because of a high thermostat setting. Alternatively, the apparatus "Heat-Off-Cool" on-off switch may not be in the "Cool" position. Further, power to the system may be disrupted or the voltage of the power supply may drop to a low level insufficient to permit operation of the system. The power interruption may be momentary or continuous.

Additional malfunctioning problems may arise from clogged air filters, furnace blower or evaporator coils. Malfunctioning of the furnace blower, such as from a blown fuse or a broken drive belt, may also cause a failure of the system. Additionally, where adjustable registers are utilized in the air distribution system, restricted, obstructed, or closed registers may similarly cause a failure of the system.

Additional failures may occur because of failure of the power supply to the outdoor condensing unit. Alternatively, such systems are caused to be inoperative when the outdoor temperature is below a preselected temperature, such as 60° F. A restriction or obstruction of the outdoor condensing unit coil may further cause malfunctioning of the system.

Such malfunctionings heretofore have ordinarily required a check of the system by a service technician inasmuch as the prior systems did not provide for indicating to the user specific information as to the cause of the failure, permitting the user, in certain instances, at least, to remedy the malfunction. The requirement of a service technician, in many cases, has been unnecessary, time-consuming, and costly. It is obviously desirable to permit the user of the apparatus to effect simple restarting of the apparatus where the malfunction is of a simple nature so as to avoid the need for the services of a service technician. It is further desirable to provide to the user some indication as to the nature of the malfunction so that suitable servicing of the apparatus, of which the normal user is capable, can be effected without the need for the services of a service technician. Alternatively, where the malfunction is of the type that should be handled by a service technician, it is desirable to provide an indication of this fact to the user so as to avoid undesirable attempts by the user to restart the system without such service technician services. Further, the indication of the malfunction facilitates repair of the air conditioner by the service technician.

Because of the present energy crisis, the problem of low voltage conditions is becoming more prevalent. Such power supply conditions may cause permanent damage to the system. However, it has been found that, quite often, the low voltage condition is temporary and, thus, it is desirable to provide some means for preventing the air conditioner from starting under low voltage conditions and automatically resetting the system upon restoration of the preselected minimum voltage. Additionally, where the stoppage of the system is caused by a power interruption, it is desirable that the system be automatically restarted upon restoration of the power.

In the case of the other above discussed malfunctionings, the user must make some correction to the system prior to the restarting of the system and, thus, a manual reset of the system is desirable. Thus, before restarting the system where the malfunctioning has occurred because of clogged filters, evaporator coils, outdoor condensing unit coils, blown fuses, etc., these conditions must be corrected before an attempt to restart the system should be made.

A number of prior art patents disclose different controls for use with air conditioning apparatus.

Alden J. Ritter et al, in U.S. Pat. No. 2,884,767, disclose a control apparatus having a resettable safety circuit reset upon de-energization of the fan circuit. The control provides an automatic reset upon power failure and requires the operation of a reset button to restart the system after other system failures. More specifically, the control is reset by adjustment of a fan switch.

In U.S. Pat. No. 3,064,444 of William K. Kyle, a safety control circuit for motors or refrigerant compressors is shown having means for permitting manual reset of the circuit in the event of an interruption due to an overload condition and an automatic reset in the event of refrigerant pressure cutout.

Lawrence H. Foster et al, in U.S. Pat. No. 3,100,383, disclose a control for refrigerators having alarm means with indicator lamps carried on a control console mounted on the top of a refrigerator for indicating different abnormal conditions of the refrigerator.

Norman P. Bergeron, in U.S. Pat. No. 3,594,749, discloses a monitoring system for refrigerated display cases provided with remote monitor lights for indicating the status of each of several display cases. A jumper means is provided for actuating a flasher to identify malfunction of critical components of the apparatus.

In U.S. Pat. No. 3,628,346, Cecil G. Lagrone, Jr. discloses an apparatus for indicating thermal and air velocity conditions of air in the plenum of a central air conditioning system such as upon a malfunction or failure of the fan or motor compressor of the system.

A monitoring system is shown in U.S. Pat. No. 3,731,294 of Leslie Vass which includes a plurality of sensors, a plurality of indicators, and a controller responding to the sensing of a predetermined condition to cause a master control to perform a preselected control function.

U.S. Pat. No. 3,742,303 of Ernest C. Dageford, shows a compressor protector system monitoring the internal temperature of a compressor motor. The system automatically rechecks after a predetermined period of time to determine whether the fault causing the stopping of the compressor has been cleared. The control automatically starts the compressor if the fault has been so cleared.

SUMMARY OF THE INVENTION

The present invention comprehends an improved control for use with central air conditioning systems and the like which provides improved monitoring of the operation of the system. The control provides an indication to the user of different malfunctionings of the system should they occur, allows automatic reset in certain cases, and provides for manual reset in certain other cases. Thus, the control is adapted to permit the user to resolve certain problems in the operation of the air conditioner system himself, thereby avoiding time-consuming and costly service calls and providing improved overall operation of the system. Illustratively, where the operation of the system is prevented by a high thermostat setting, the user need merely lower the setting. Similarly, where the operation is prevented by the control switch being other than in the "Cool" position, the user may rectify this condition by throwing the switch to the "Cool" position. Where the power failure is caused by the blowing of the circuit breakers or fuses at the main fuse box, the user may rectify this condition by reclosing the circuit breaker or replacing the fuse. The control of the present invention is arranged to automatically restart the system once these conditions are corrected.

Where the system shutdown is caused by clogged filters or coils, failure in the furnace blower means, or closed or partially closed conditions of the air flow registers, the user may correct these conditions and effect a manual restart of the system after a preselected period of time.

In the event the system does not restart after the indicated malfunctioning is corrected, a service technician may be called to rectify the specific problem causing the maintained inoperative condition.

The invention comprehends locating the indicating means adjacent the system thermostat or improved facilitated determination of such malfunctioning. As in conventional use of such refrigeration systems the user may periodically refer to the thermostat control, an automatic check of the operating condition of the system is effected by the location of the protection system indicating lights adjacent thereto so as to be readily discernible by the user at the time of checking the thermostat.

The automatic resetting of the control system is related to problems external to the air conditioner and the requirement of manual resetting is related to problems within the system so as to automatically provide a distinction between the two areas for facilitated recognition of the specific malfunction problem.

The voltage sensing circuit permits wide variations in the power supply voltage while preventing operation under a preselected minimum voltage condition. The control is arranged so that an attempted restart of the system is not effected until such time as the voltage rises to above the preselected minimum and the control is arranged to require at least a minimum time delay after any drop of the voltage below the preselected minimum before a restart can be attempted.

By permitting the air conditioning system to operate when possible and by indicating to the user the need for certain maintenance steps to eliminate a system off condition, elimination of unnecessary service calls by service technicians is effected, thereby providing for improved system operation and customer satisfaction.

More specifically, the invention comprehends providing a central air conditioning system having a wall-mounted thermostat provided with means for selecting a desired temperature to be provided by the air conditioner system and control means for selectively de-energizing and energizing the air conditioner system, as a function of preselected conditions, and indicating means adjacent the thermostat for indicating a malfunctioning of the air conditioning system causing said control means to deenergize the system.

Further more specifically, the invention comprehends providing such an air conditioning system wherein the control means is arranged to automatically selectively de-energize and energize the system and the indicating means selectively indicates a malfunctioning requiring a resetting of the control means before re-energization of the system may be effected, with manually operable switch means being disposed adjacent the indicating means for effecting the resetting of the control means.

In the illustrated embodiment, the indicating means comprises a plurality of signal lights mounted adjacent the thermostat and selectively operated by the control means to provide suitable information by different permutations and combinations of the energization and de-energization of the signal lights.

Indications provided by the indicating means include indications of malfunctioning where no action need be taken by the user with the malfunctioning being self-clearing, an indication of a malfunctioning requiring action to be taken by the user such as replacing blown fuses, cleaning clogged air filters, and the like, and an indication of a malfunctioning requiring attention by a service technician or the like.

The control of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figures 1, 2, 3:
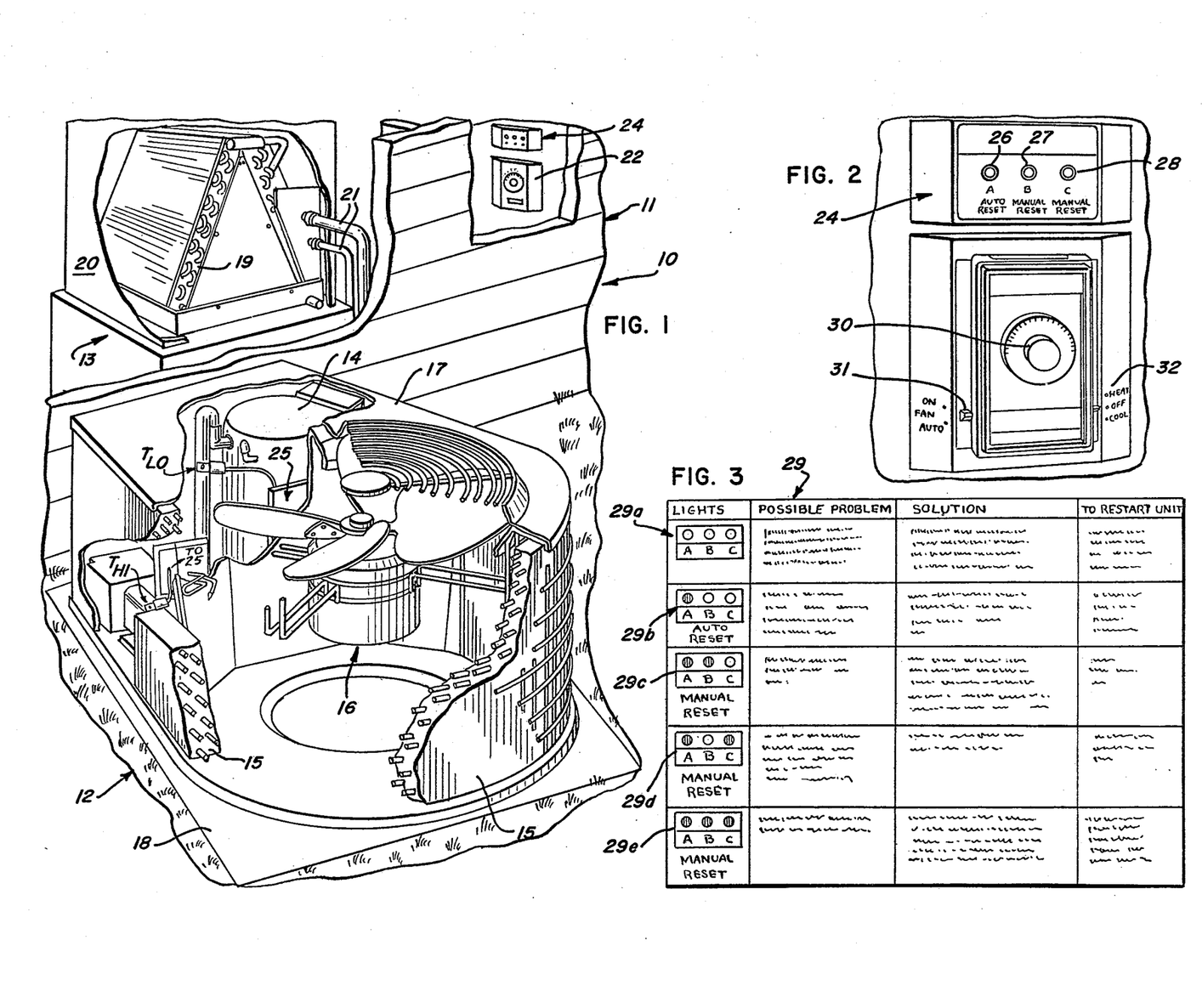
FIG. 1 is a fragmentary perspective view with portions broken away illustrating an air conditioning system having an improved control embodying the invention.
FIG. 2 is a perspective view of the wall-mounted control means of the invention.
FIG. 3 is a schematic representation of a chart for advising the user of the meaning of different indicator light signals relative to different malfunctions of the air conditioning apparatus.

In the exemplary embodiment of the invention as disclosed in the drawing, a refrigeration apparatus generally designated 10 is shown to comprise a central air conditioning apparatus such as for use in air conditioning a residence 11. The apparatus includes an outdoor portion generally designated 12 and an indoor portion generally designated 13.

The outdoor portion more specifically includes a motor-driven compressor 14, a condenser coil 15, and a condenser fan and motor 16. The outdoor portion is housed in a cabinet 17 to protect the apparatus against the elements. As shown, the apparatus is conventionally installed on a base 18.

The refrigeration system further includes an evaporator 19 which is conventionally installed in the forced air furnace system plenum 20 and connected to the outdoor apparatus 12 by conduits 21.

Operation of the air conditioning system is controlled by a thermostat 22 disposed at a suitable sensing location within the residence. The present invention comprehends an improved additional control means 23 for monitoring the air conditioning system and advising the user of malfunctioning of the system.

The monitoring control includes an indicating portion 24 mounted adjacent the thermostat 22 and a circuit board portion 25 mounted within the cabinet 17 of the outdoor system portion 12. The circuit board portion comprises a solid state circuit board adapted to continuously monitor operation of the refrigeration apparatus and provide to the indicating portion 24, through interconnecting wires, signals for selectively energizing the indicating portion to warn of malfunctioning of the apparatus.

As shown in FIGS. 2 and 3, indicating portion 24 includes three signal lights 26, 27 and 28, which may be individually or jointly energized by the control portion 25 to indicate different malfunctionings of the apparatus. As shown in FIG. 3, a chart 29 may be provided to indicate to the user the possible problem, solution to the problem, and the method of restarting the refrigeration system as a function of the condition of the three indicating lights whenever operation of the system is interrupted. Thus, as shown in FIG. 3, each of the signal lights 26, 27, and 28 may be de-energized as illustrated in chart portion 29a, signal light 26 alone may be energized as shown in chart portion 29b, signal lights 26 and 27 alone may be energized as shown in chart portion 29c, signal lights 26 and 28 alone may be energized as shown in chart portion 29d, and all three signal lights may be energized as shown in chart portion 29e, for indicating different malfunctions of the apparatus. The malfunctions of chart portions 29a and 29b comprise automatically resettable malfunctions and the malfunctions indicated by the signal arrangement of chart portions 29c, 29d, and 29e comprise malfunctions requiring manual reset of the apparatus.

Referring again to FIG. 2, the thermostat may include a control knob 30 for selectively setting the desired temperature of the refrigeration system in the normal manner. Associated with the thermostat in the same housing may be provided a fan switch 31 selectively positionable in "On" and "Automatic" positions, and a selector switch 32 selectively positionable in "Heat", "Off", and "Cool" positions.

To effect a manual reset of the system, the user may move the switch 32 to the "Off" position and then to the "Cool" position in the event the system has been off for at least three minutes.

Figure 4:
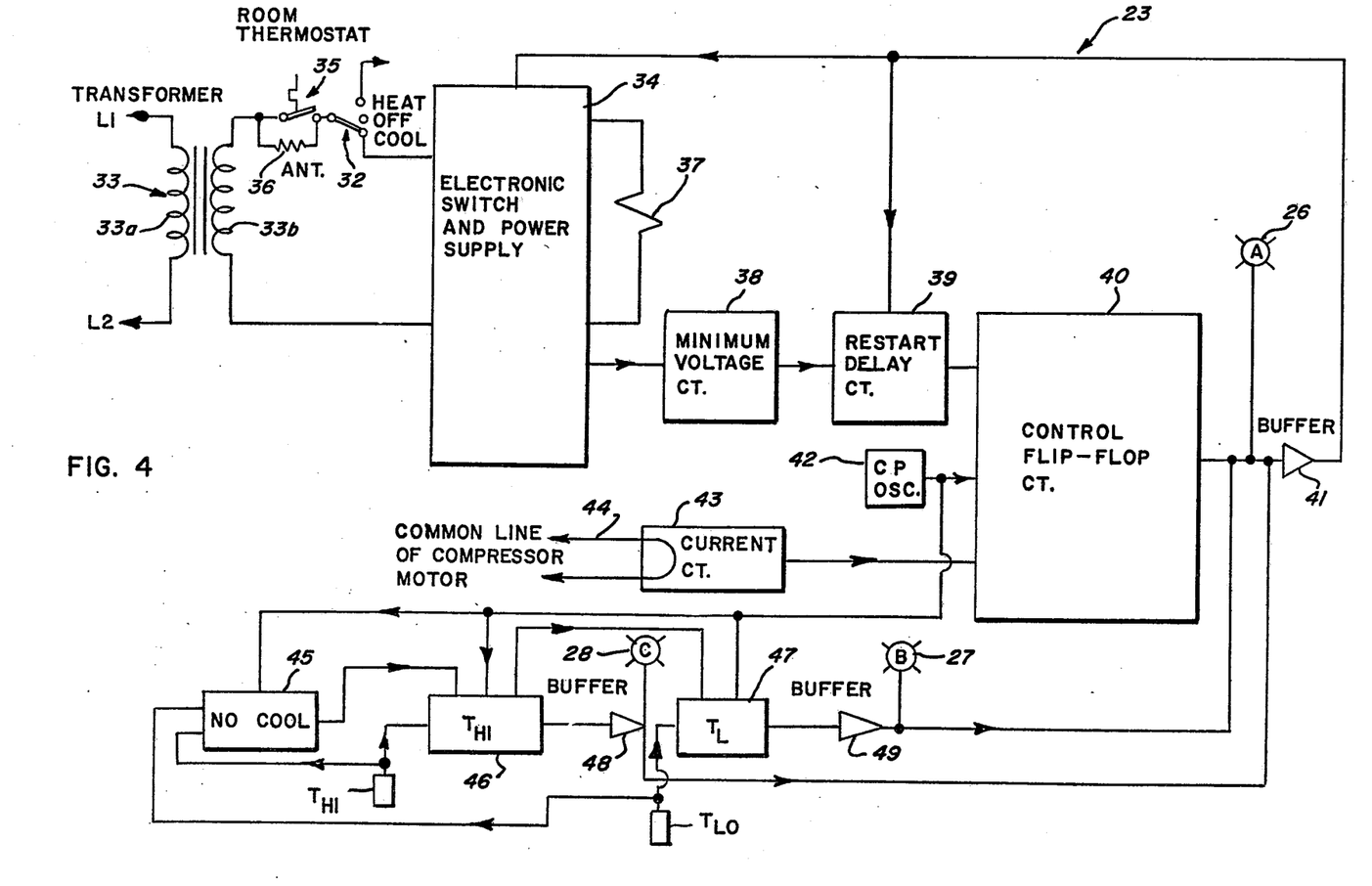
FIG. 4 is a schematic block diagram of the control.

More specifically, one illustrative form of chart 29 is shown herein as Chart A. To provide the indicated functioning, control 23 may be arranged as shown in FIGS. 4 and 5. Broadly, the control as illustrated in FIG. 4 includes an output step down transformer 33 having a primary winding 33a connected to power supply leads L1 and L2. The transformer may have a 1–10 step down ratio so as to provide 24 volts across the secondary winding 33b when the power supply is a rated 240-volt supply. An electronic switch and power supply 34 is connected across secondary winding 33b in series with the room thermostat switch 35 adjustably controlled by knob 30 and the "Cool" setting of the selector switch 32. An anticipator resistor 36 illustratively having a value of approximately 10 kilohms may be connected across the thermostat switch. The compressor contactor coil 37 is connected to electronic switch and power supply 34.

The control further includes a minimum voltage circuit 38 connected to switch 34 and in series with a restart delay circuit 39. Circuits 38 and 39 are connected in series with a control flip-flop circuit 40 which, in turn, is connected through a buffer transistor 41 back to the control switch 34. Signal light 26 is connected between flip-flop circuit 40 and buffer 41.

A clock pulse oscillator 42 provides clock pulses to the flip-flop circuit 40. A current sensing circuit 43 senses current in the compressor motor line 44 for feeding a signal to the flip-flop circuit 40.

CHART A

| INDICATION OF DISPLAY LIGHTS | MEANING | POSSIBLE CAUSES |
|---|---|---|
| ALL LIGHTS OFF | Unit is off or running normally. | |
| "A" (ONLY) | Unit has stopped running. Will restart after three minutes. | MOMENTARY INTERRUPTION OF INCOMING HOUSE POWER, SUCH AS ELECTRICAL STORM OR POWER COMPANY WORKING ON LINES IN THE AREA. THERMOSTAT HAS BEEN TURNED OFF AND BACK ON TOO QUICKLY OR JIGGLED. *Incoming line voltge too low for compressor to continue running. *Loose connections or undersized wiring. *Possible failures: Compressor; Compressor run capacitors; contactor. *Reduction of 24 volt power to unit, below 18 volts. |
| "A" LIGHT ON BUT BLINKS OFF EVERY THREE MINUTES | Unit has stopped but tries to start every three minutes. | *Excessive starting current cause by: 1. Line voltage too low. 2. Restriction in high pressure side of refrigeration system. 3. Loose connection or wiring undersized. 4. Possible failures: Compressor; compressor run capacitors; contactor. |
| "A" AND "B" | Unit in a freeze condition. Manual reset at thermostat required for further operation. | DIRTY FILTERS OPERATING UNIT WHEN OUTDOOR TEMPERATURE IS BELOW 60°. *Loss of air flow across evaporator caused by: 1. Low or no voltage to indoor blower 2. Possible failures: Indoor blower motor; or its |

CHART A-continued

| INDICATION OF DISPLAY LIGHTS | MEANING | POSSIBLE CAUSES |
|---|---|---|
| ALL LIGHTS OFF | Unit is off or running normally. | |
| "A", "B", & "C" | Unit in an overheat condition. Manual reset required for further operation. | capacitor; blower belt; fan relay.<br>3. Indoor coil fins and/or blower vanes plugged with dirt.<br>4. Loose blower wheel or pulley set screw.<br>CONDENSING UNIT COIL DIRTY OR BLOCKED WITH LEAVES, GRASS, ETC.<br>OUTDOOR AMBIENT ABOVE 125° F.<br>*Condenser fan not running, caused by:<br>1. Obstruction in fan blade.<br>2. Possible failures: Condenser fan motor; motor capacitors; solid state control; fan blade.<br>3. Loose set screw on fan.<br>*Slight restriction in refrigerant system causing excessive discharge pressures.<br>*System overcharged with refrigerant or air in system. |
| "A" AND "C" | Unit is not cooling. Manual reset required for further operation | LOSS OF 240VAC TO CONDENSING UNIT CAUSED BY:<br>1. CIRCUIT BREAKER TRIPPED.<br>2. DISCONNECT IN "OFF" POSITION.<br>*Air Conditioning System is short on refrigerant.<br>*Possible failures: Compressor; compressor run capacitors; contactor.<br>*Large quick connect fitting plugged. |

*THESE MALFUNCTIONS MAY REQUIRE A TRAINED SERVICEMAN.

Additionally connected to the flip-flop circuit is a "No-Cool" circuit 45, a high temperature circuit 46, and a low temperature circuit 47. The output of the high temperature circuit 46 controls the signal light 28 through a buffer transistor 48 and the low temperature circuit 47 controls signal light 27 through a second buffer transistor 49.

Control 23 receives input information from different portions of the apparatus and provides control of the signal lights as well as automatic control of the operation of the apparatus as a function of the input signals. Illustratively, the control flip-flop 40 is responsive to the minimum voltage circuit monitoring the voltage of the power supply leads L1 and L2 to prevent starting of the refrigeration apparatus unless the voltage exceeds a preselected low value, such as 180 volts. Inasmuch as step down transformer 33 provides a 1-10 ratio, the minimum voltage circuit more specifically responds to a drop in the secondary voltage below 18 volts to prevent refrigeration apparatus operation.

The control further provides for interruption of the operation in the event the compressor motor current rises above a preselected level during the running of the motor. The control is arranged to prevent interruption of the operation pursuant to a high starting current for a preselected period of time, such as one second. More specifically, the control is arranged to prevent operation of the system under a high current condition which would tend to damage the motor, while permitting the system to run where the current condition is not so damaging.

The high temperature circuit 46 receives a signal from a temperature sensor $T_{HI}$ including a thermistor 50 and the low temperature circuit 47 receives a signal from a temperature sensor $T_{LO}$ including a thermistor 51. The low temperature sensor $T_{LO}$ is located near the compressor shell on the refrigeration suction line to measure the refrigeration cooling effect and the compressor motor heat and as connected to circuit board 25 through connecting leads not shown. The high temperature sensor $T_{HI}$ is associated with the condenser coil in the saturation region of the condenser return bends and is also connected to circuit board 25 through connecting leads not shown.

The control 23 provides five protection functions in the system. One such protection function comprises short cycle protection. It is desirable in compressor-type refrigeration apparatus to void attempting to restart the compressor shortly after a termination of operation thereof because of the remaining relatively high head pressure in the system. Such pressure can cause the compressor rotor to lock resulting in exceptionally high current overheating of the motor with potential burn-out. The present control helps prevent such burn-out by requiring that the compressor motor contactor coil 37 remain de-energized for at least 3 minutes before attempting to restart the motor. As long as the contactor coil is caused to remain de-energized when thermostat 35 is closed calling for cooling, the signal light 26 is illuminated to provide information as to this condition.

A second protection afforded by the control comprises a locked rotor protector function. In this portion of the control, the compressor motor current is continuously monitored so that should this current reach a preselected high level which is maintained for at least 1 second the contactor coil 37 is de-energized to disconnect the compressor motor from the line. As before, the control prevents an attempted restarting of the compressor motor for at least 3 minutes. The control causes an automatic restarting at the end of that time so as to continue operation of the air conditioning system in the event the cause of the overcurrent was a temporary condition. Should the overcurrent cause be continued, the control will automatically cycle the compressor motor on and off while preventing an overheated condition thereof by virtue of the extended 3-minute delay between starting operations compared to permitting overcurrent for only 1 second.

In the operation of the evaporator portion, room air is flowed in heat transfer association with the evaporator coil so as to effect the desired cooling of the air. Under certain conditions, such as low humidity, the evaporator may become clogged with frost or ice deposits, causing the liquid refrigerant to be incompletely vaporized in the evaporator. Return of liquid refrigerant to the compressor can damage the compressor and is to be avoided.

Other reasons for insufficient vaporization of the refrigerant in the evaporator may also rise, such as insufficient air flow or nonexistent air flow, due to failures of the air flow system. Still further, relatively low outdoor temperatures may cause such freeze-up of the evaporator.

By locating the low temperature sensor $T_{LO}$ on the suction line of the compressor, a determination of the system condition is made before freeze-up occurs to cause de-energization of the contactor coil 37 and concurrently cause an illumination of both indicating lights 26 and 27. As shown in Chart A, the concurrent illumination of these lights indicates a condition which will require a manual reset of the system inasmuch as the conditions discussed above will not normally eliminate themselves but will require positive action on the part of the user or service technician. Here again, before the system may be restarted, a minimum time delay of at least three minutes is required to prevent damage to the compressor motor.

Another malfunctioning which may occur from time to time is the clogging of the condenser coil such as with leaves or dirt, or the failure of the compressor fan. This malfunctioning causes a high discharge pressure which, if not corrected, may cause eventual failure of the compressor. The high temperature sensor $T_{HI}$ senses the temperature of the return bend of the condenser coil and controls the system to prevent such high discharge pressures. Operation of the control circuit portion 46 by the sensor $T_{HI}$ causes all three indicating lights to be illuminated.

A fifth malfunction sensed by the control 23 is a no cooling/loss-of-charge protection function. Thus, should the system fail to cool such as if, for any reason, the refrigerant charge in the system drop or be lost or if the compressor fails to run due to an electrical component failure, this portion of the control operates the signal lights 26 and 28. Normally, an operating, properly charged system causes the suction line temperatures at the compressor to drop rapidly below the ambient temperature upon initiation of the operation of the system. The control senses a cndition wherein the temperature on the suction line remains above a preselected temperature for over seven minutes of system operation to effect termination thereof. Here again, as this condition does not automatically eliminate itself, it is necessary for the operator to manually reset the system and, thus, upon repeated shutdown due to this condition, the user is advised of the need for a service technician to determine the cause of the lack of cooling whether as a result of a loss of charge and effect a recharging of the system or repair of the component or components that are preventing compressor operation before further operation of the system may be effected.

Figure 5A:
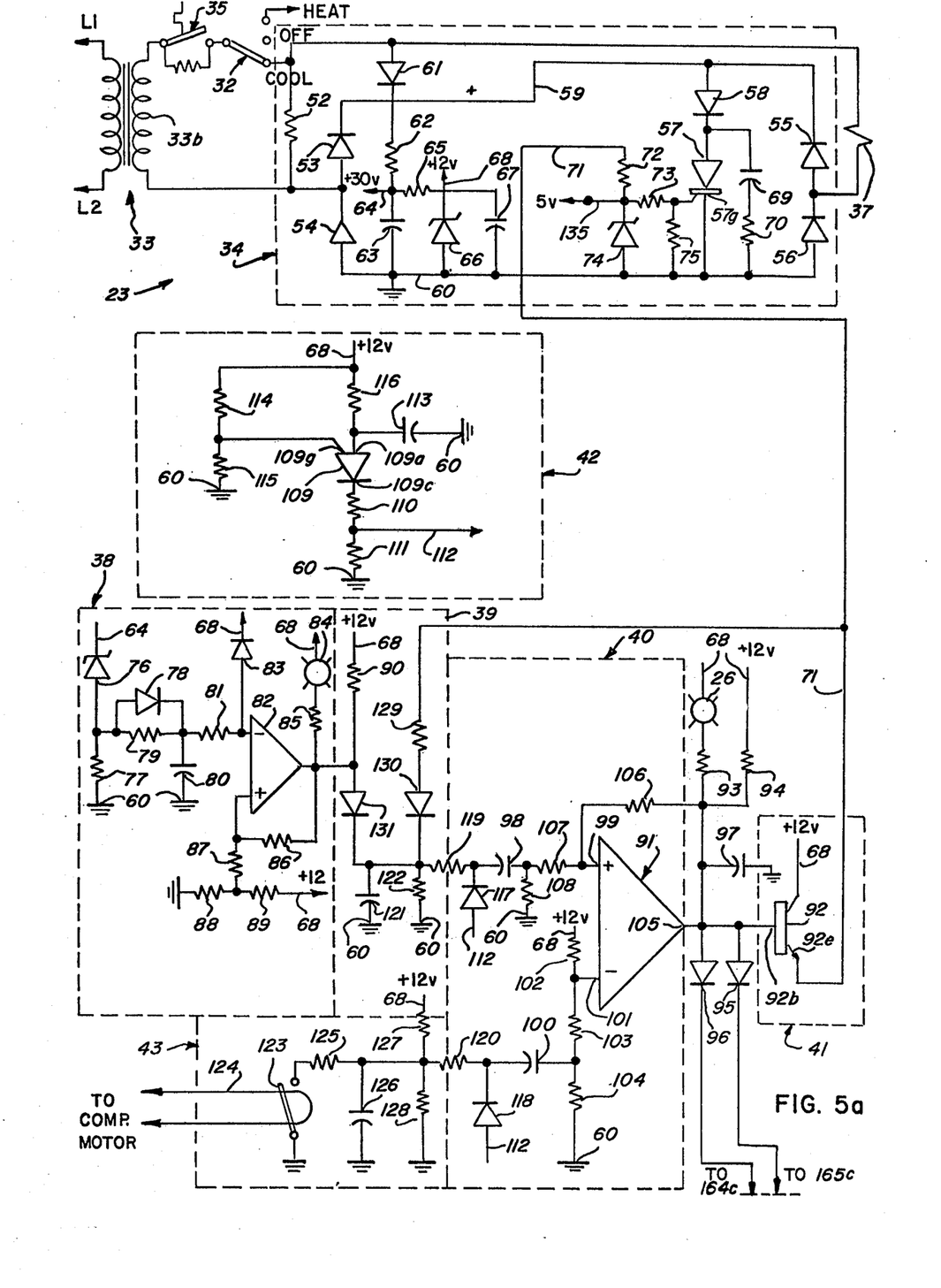
FIG. 5 is a schematic wiring diagram thereof; the drawing being broken down into FIGS. 5a and 5b on separate drawing sheets.
Figure 5B:
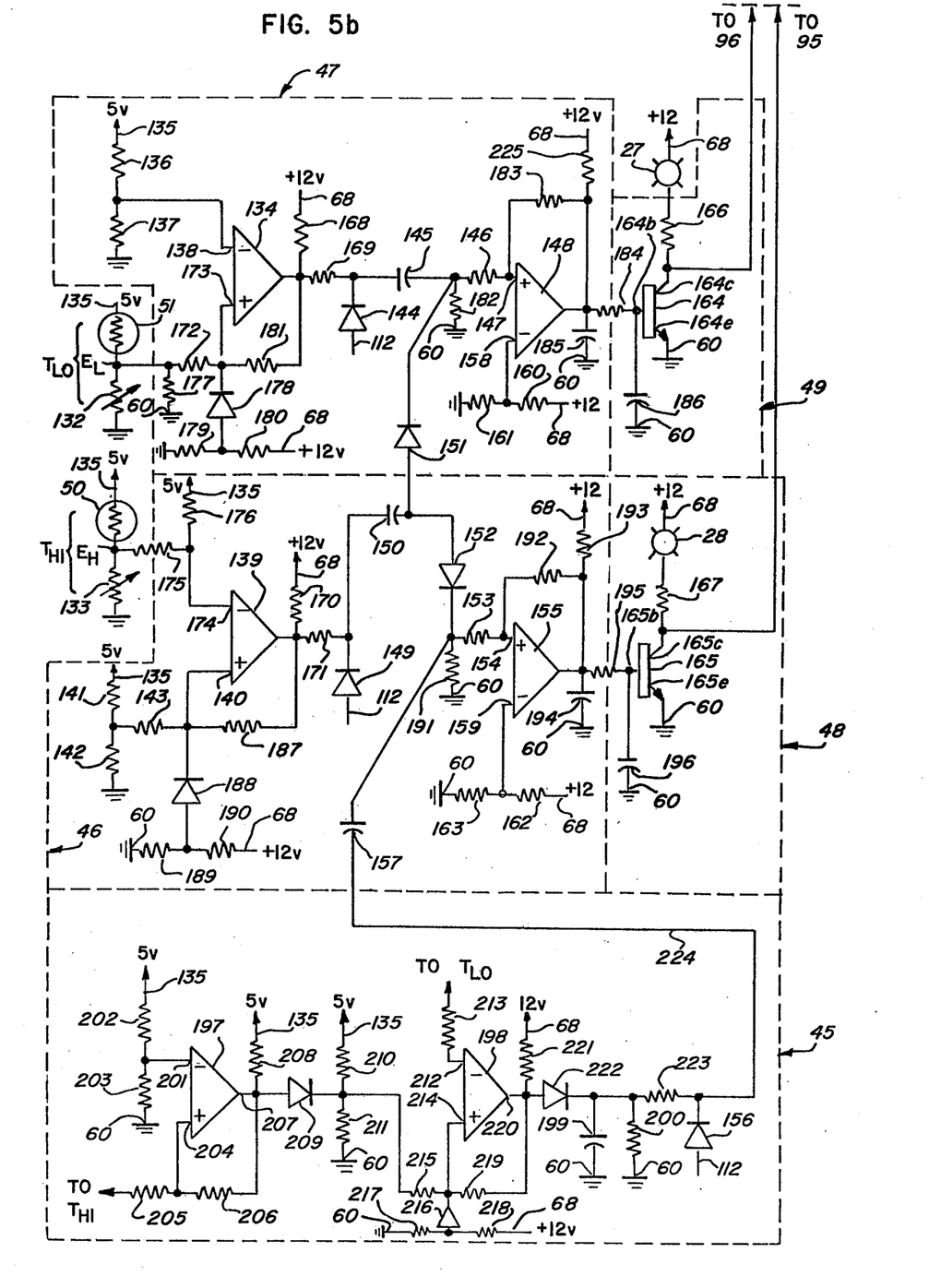

Referring now more specifically to the electrical wiring diagram of FIG. 5 portions 5a and 5b, the electronic switch 34 includes an input 1 kilohm resistor 52 to provide a load at the input for anticipator resistor 36 in the "Off" mode of the control. Diodes 53, 54, 55 and 56 define a bridge rectifier for the silicon controlled (SCR) switch 57 of circuit 34. A diode 58 is connected in series with SCR 57 between the bridge + lead 59 and the common lead 60 of the bridge rectifier. Thus SCR 57 defines a switch in series with the thermostat switch 35 and is the basic controlled switching device of the control 23. The circuit is arranged within electronic switch 34 so that when SCR 57 is on, alternating current can flow through the contactor coil 37. However, when the SCR 57 is off, contactor coil 37 is deenergized notwithstanding the closing of thermostat switch 35.

As shown in FIG. 5a, all electrical power is derived from the power supply leads L1 and L2 both for the contactor coil 37 and the entire control 23 for facilitated installation of the control. The main direct current voltage supply for the control 23 comprises a 30-volt supply obtained by means of a diode 61 connected in series with a 27 ohm resistor 62 and a 25 microfarad filter condenser 63 between thermostat switch 35 and common line 60.

The common line 60 is illustrated herein as the negative side of the main direct current power supply with the 30-volt + line being designated 64. Common lead 60 may or may not be grounded to the earth or chassis, as desired.

A 12 volt direct current supply voltage is further obtained by means of a 680 ohm dropping resistor 65, a 12-volt Zener diode 66, and a 5.0 microfarad filter condenser 67. Thus, this circuit provides a 12-volt regulated secondary direct current voltage supply 68 for use in the control.

A 0.1 microfarad condenser 69 and a 27 ohm resistor 70 are connected across SCR 57 to prevent false turn-ons due to voltage transients. The gate 57g of SCR 57 is provided with a signal from line 71 through a 680 ohm resistor 72, a 2.2 kilohm resistor 73, and a 1 kilohm resistor 75.

A 5-volt direct current supply voltage is obtained by means of resistors 72, 73 and 75 with a 5-volt Zener diode 74. Thus, this circuit provides a 5-volt regulated secondary direct current voltage supply 135 controlled by the signal on line 71.

While the voltage supply line 64 is characterized as a 30-volt + side line, it will be obvious that as the voltage at supply leads L1 and L2 varies from the rated voltage of 230 volts, the secondary voltage will correspondingly vary and, thus, the voltage on supply lead 64 is directly proportional to the supply line voltage being 24 volts when the supply line voltage is at its rated 230-volt value. The maximum expected voltage on line 64 is 30 volts, and is thus designated as a 30-volt supply.

As indicated briefly above, the control includes a minimum voltage control portion 38. This control portion includes a 20-volt Zener diode 76 connected to the power supply 64 and through a 10 kilohm resistor 77 to common 60. The voltage signal is delivered through a filter including a diode 78, a 1 megohm resistor 79, a 0.1 microfarad condenser 80, and a 10 kilohm buffer resistor 81 to a comparator 82. The comparator output is low when the secondary voltage of transformer 33 is above 18 volts AC. The resistor 79 permits the charge on condenser 80 to be dissipated to common 60 whenever the voltage on supply 64 drops below the conduction voltage of Zener diode 76. A clamping diode 83 may be connected to the comparator to prevent any problem in the event of high input voltage of the input from power supply lead 68.

A signal light 84 may be connected from the 12-volt power supply lead 68 through a 2.2 kilohm resistor 85 to the output of comparator 82. A hysteresis network, including a 10 megohm resistor 86, a 10 kilohm resistor 87, is provided to smooth out operation at the voltage switching threshold of the comparator. A 10 kilohm resistor 88 and 100 kilohm resistor 89 comprise a voltage divider connected to the 12-volt supply 68 and common 60 to provide a voltage reference for the comparator 82 (+) input.

The (−) input to the comparator follows changes in the AC line voltage at $L_1$, $L_2$, and the comparator functions so as to provide a low output when the (−) input is high and a high output when the (−) input is low. Thus, the minimum "Try Start" line voltage is determined by the lowest (−) input voltage condition resulting in a high output. The circuit functions so as to provide a "Try Start" timing in the order of microseconds and a "No Try Start" decay in the order of milleseconds to prevent micorsecond voltage dips from causing nuisance "No Try Start" conditions.

Lamp 84 is illuminated only when there is sufficient voltage for the "Try Start" condition and, thus, the lamp indicates, when off, that a low voltage condition exists preventing operation of the apparatus. A 10 kilohm resistor 90 is connected across the series connection of lamp 84 and resistor 85 to allow the comparator output to function notwithstanding the disconnection or failure of the lamp circuit.

Control of SCR 57 is provided through a lead 71 from buffer 41. Flip-flop 91 of control flip-flop circuit 40 is connected to the base 92b of an NPN transistor 92 having its emitter 92e connected to lead 71. The signal light 26 is connected in series with a 2.2 kilohm resistor 93 to the output of flip-flop 91 and the series connection of the light and resistor 93 is shunted by a 10 kilohm shunt resistor 94. The 5-volt source 135 provided by Zener diode 74 connected through resistor 73 to gate 57g of the SCR 57 is turned on and off by the transistor 92. Resultingly, when the flip-flop output is high, the output from the transistor is sufficient to cause the voltage applied to the SCR gate to be sufficient to turn the SCR on energizing contactor coil 37 causing the compressor motor contactor to pull in to cause a running of the air conditioning system. Conversely, when the output of flip-flop 91 is low, the SCR is caused to be off so as to prevent energization of the coil 37 and operation of the air conditioner system.

The output of flip-flop 91 also controls the energization of lamp 26 so that when the output is high to cause operation of the air conditioning system, no current flows through the lamp. When the lamp is illuminated by a low condition of the flip-flop output, a signal is provided to the user that the system is preventing from operating. A disconnection or failure of the lamp 26 does not prevent operation of the control by virtue of the shunt resistor 94.

Diode 58 isolates the SCR from the bridge AC current. Diodes 95 and 96 are provided for turning off the flip-flop and, accordingly, the air conditioning system under certain temperature conditions. The diodes 95 and 96 force the flip-flop output low when they are conducting so as to effect this desired shutdown of the system. As further shown, a 0.001 microfarad condenser 97 may be provided between the flip-flop and the common lead 60 to prevent noise voltages from operating the system.

The input of flip-flop 91 is provided through a 0.01 microfarad condenser 98 to the (+) input (Set) 99, and a 0.01 microfarad condenser 100 for the (−) input (Reset) 101. A pulse delivered to the input 99 causes the flip-flop to latch high and a pulse delivered to the input 101 causes the flip-flop to latch low to correspondingly turn the air conditioning system on or off. The flip-flop 91 arranged to power-up with the output low as necessary for the logic functions.

Flip-flop 91 may comprise a standard comparator arranged so that when the input 99 is higher than the input 101, the output is high and when the input 101 is higher than the input 99, the output is low. The input 101 is connected to the 12-volt supply 68 through a 220 kilohm resistor 102 and through a 10 kilohm resistor 103 and a 1 kilohm resistor 104 to common 60 with the resistors forming a voltage divider network providing approximately a 0.5-volt DC to the input 101. The voltage on input 99 is a latch-type voltage provided by the feedback connection to the flip-flop output 105 through a 120 kilohm resistor 106, in conjunction with a 10 kilohm resistor 107, and a 1 kilohm resistor 108 connected to common 60. Thus, when the voltage on output 105 is high, the input 99 voltage is approximately 0.75 volts and when the output voltage is low, the input voltage is approximately 0.01 volts. The feedback resistor 106 controls this latching function. Thus, on start-up of the system, the output 105 voltage is low and the voltage at input 99 is lower than the voltage on input 101 so that the flip-flop is latched low and the compressor contactor is maintained open. A pulse delivered through the condenser 98 raises the voltage on input 99 to cause the flip-flop output to go high, thereby providing a feedback through resistor 106 latching the flip-flop high. Reversely, when the flip-flop output is high, a voltage pulse provided to input 101 causes the flip-flop to flip and latch the circuit low. When the output is low, a Reset pulse on input 101 has no effect, and when the output is high, a Set pulse on input 99 has no effect. The high latch value of the input 99 requires that the voltage of the Reset pulse on input 101 be somewhat higher than 0.75 volts to flip the circut low.

The clock pulse oscillator 42 provides clock pulses to the control, as discussed above. The oscillator includes a programmable unijunction tansistor 109 having its cathode 109c connected through a 470 ohm resistor 110 and a 680 ohm resistor 111 to common 60. The clock pulse output 112 is taken from a voltage divider comprising resistors 110 and 111 to provide a correct peak magnitude of the clock pulse, approximately 3.5-volts, and provide a discharge path for 1.5 microfarad condenser 113 upon firing of transistor 109. The voltage applied to gate 109g is controlled by a pair of resistors including a 4.7 kilohm resistor 114 and a 15 kilohm resistor 115 connected between 12-volt power supply lead 68 and common 60, and a 470 kilohm resistor 116 connected between 12-volt lead 68 and the anode 109a of transistor 109. Thus, resistors 114 and 115 program the firing point of transistor 109.

Thus, when circuit 42 is powered up, the anode voltage begins to build up through the R-C network of resistor 116 and condenser 113, and approximately 1 second after 12 volts is supplied to this circuit from lead 68, the transistor 109 fires transmitting a first clock pulse through output 112. The oscillator circuit then continues to provide a clock pulse each second until the 12-volt power supply from lead 68 is interrupted, whereupon the gate voltage of transistor 109 drops and the residual charge on condenser 113 is dissipated to common 60. Thus, on the next power-up, one full pulse period must transpire before the first clock pulse is delivered through output lead 112. As shown in FIG. 5a, clock pulse lead 112 is connected through a first diode 117 to condenser 98 and through a second diode 118 to condenser 100. Diode 117 is biased by a 1 megohm resistor 119 and diode 118 is biased by a 1 megohm resistor 120. At a given instant, the clock pulses will feed through the respective condensers 98 and 100 depending on the voltage applied to resistors 119 and 120. The voltage applied through resistor 119 to diode 117 is provided by restart delay circut 39. Restart delay circuit 39 includes an R-C circuit including a 22 microfarad condenser 121 and a 5 megohm resistor 122. Condenser 121 is charged when the comparator 82 output is high.

Assuming that the control has been off for a period of time, such as three minutes, the charge on condenser 121 is low and, thus, when the power is again supplied through leads L1 and L2 to the circuit, the first clock pulse from lead 112 feeds through diode 117 and condenser 98 to the input 99 turning on the flip-flop 91 to start the air conditioning system, as discussed above. The first clock pulse cannot pass through diode 118 as the voltage on resistor 120 is high. The voltage on resistor 120 is controlled by the current circuit 43. A voltage divider circuit including a 1 megohm resistor 127 and another 1 megohm resistor 128 connected between the 12 volt power supply lead 68 and common 60 set a high voltage on resistor 120. This high voltage condition is maintained by the maintained open condition of a reed switch 123. As the compressor motor starts, the reed switch is closed by the current flowing through conductor loop 124. Within the 1 second period of the first clock pulse delivery, the compressor motor current drops back to the full load ampere rating permitting reed switch 123 to open before the next clock pulse is delivered. In the event the compressor fails to start and high lock rotor amperes continue to flow through the turn 124, reed switch 123 oscillates open and closed at twice the AC line frequency and on the next clock pulse, the voltage on resistor 120 is low to allow the clock pulse to pass through diode 118 and condenser 100 to the reset input 101 turning off the flip-flop and interrupting operation of the air conditioning system. The use of the reed switch provides extremely rapid protection of the air conditioning system motor while yet utilizing conventional low cost control means. In circuit with the reed switch is a 10 kilohm resistor 125 and a 0.1 microfarad condenser 126. Condenser 126 forms a filter that operates to maintain the voltage on resistor 120 low when the reed switch 120 is oscillating open and closed in response to locked rotor current flow in line 124. Resistor 125 limits the current discharge of condenser 126 through the contacts of reed switch 123 to prevent welding of the contacts.

Assuming that voltage is applied to power supply leads L1 and L2 and the flip-flop 91 is on, the air conditioning system will be operating. The voltage applied to condenser 121 and resistor 122 will be the 12-volt power supply 68 through transistor 93, a 10 kilohm resistor 129 and diode 130. This voltage is maintained as long as the "run" condition continues and accordingly maintains condenser 121 charged. When operation of the apparatus is interrupted for any reason, this voltage is no longer applied and the charge on condenser 121 begins to decay. Toward the end of an approximately 3 minute period, the voltage applied to resistor 119 has decayed to the point where the clock pulse is delivered through diode 117 so that the clock pulse will now feed input 99. As the voltage on resistor 119 continues to decay the amplitude of the resultant pulses increases so that the voltage applied to input 99 exceeds the bias voltage on input 101 and flip-flop 91 goes high. Thus, the only way that the air conditioning system can be restarted is to await the decay of the charge on condenser 121. This 3-minute delay prevents damage to the system components and permits the system pressures to equalize and the compressor motor to cool before attempting a restarting of the system. It should be noted that this restarting delay is assured even though power is removed from the control as it involves the previously stored charge on a condenser component of the control system. Thus, even though power may be again provided after an interruption, the 3-minute period must time out before restarting of the apparatus can be effected. As discussed briefly above, the delay on normal thermostat cycling is one second after the thermostat closes only because the recycling of the thermostat normally requires a period of longer than the 3 minutes required to permit the voltage on condenser 121 to decay sufficiently.

The use of clock pulses to provide the start signal at input 99 permits aa longer time delay from the condenser 121 than is normally practical from such an R-C time delay circuit using components having the values listed above. Thus, an extended duration in the timing operation is obtained by utilizing the end portion of the R-C decay curve, which normally cannot be used because of difficulty in obtaining accurate repetitive timing thereat.

The R-C time constant for the 5-megohm resistor 121 and the 22 microfarad condenser 122 listed above is 110 seconds. By utilizing the clock pulses applied through diode 117 a 180 second period is timed with greater accuracy than would be the case if the R-C timing circuit were connected directly to input 99 of flip-flop 91.

The condenser 121 is further charged by a diode 131 connected to the output of comparator 82 to prevent starting of the system if the voltage on power supply leads L1 and L2 is below the "Try Start" voltage (illustratively 180 volts as discussed above). More specifically, if the input voltage is below the "Try Start" voltage, the comparator output is high and the voltage on condenser 121 is maintained high until the low voltage condition is eliminated.

By connecting the comparator 82 to the R-C time delay circuit, a power supply voltage and time integral is provided to validate the condition of the power supply. This connection prevents starting of the system until the power supply voltage has risen above the minimum value and the R-C circuit has decayed down to permit the clock pulses from supply 112 to reset flip-flop 91. Thus, rapidly changing line voltage conditions do not cause an attempted restarting of the control once the voltage drops below the minimum value until the 3 minute delay period has timed out. It should be noted that whenever the line voltage drops below the preselected value, the 3 minute time delay is refreshed. Thus, it is necessary that sufficient voltage be applied to the system for at least 3 minutes before a resetting of the flip-flop 91 can be effected.

Comparator 82 has no effect on the continued operation of the system in the event that the voltage drops below the desired voltage once the compressor is running such as where the line voltage is only slightly above the minimum value prior to the starting of the system. By preventing turning off of the flip-flop 91 under such conditions, increased stability in the functioning and control of the system is provided. To prevent damage, however, to the system in the event of severe abnormal voltage conditions, current circuit 43 causes the flip-flop 91 to go low at the next clock pulse. Ordinarily, if the line voltage is depressed a small amount or for a short duration, the reed switch will not be operative to turn off the flip-flop because the current drawn by the compressor motor will not operate the reed switch until the voltage has dropped so low that the compressor stalls reestablishing locked rotor current conditions. The illustrated circuit thusly extends the limits of the minimum low voltage protection and the high current protection while effectively protecting the apparatus. By doing so, greater stability is obtained in the operation of the apparatus, avoiding unnecessary shutdowns and undue compressor stress.

A low cost reliable conventional reed switch may be utilized in current circuit 43. Such reed switches may be readily applied to circuit 43 by picking the number of turns of the compressor lead 124 around the reed switch for desired current level control. Thus, potential high induced voltages at short-circuit current conditions are avoided as would not be the case if a normal current transformer was used. An output of "Open" is thus provided when the current is full load amperes or less and a "Closed" output is provided when the current is locked rotor amperes for the given motor. As mentioned above, the reed switch vibrates at twice the line frequency because of the AC current actuation thereof. However, the signal generated by the reed switch is filtered by condenser 126 to assure that the voltage at resistor 120 is below the clock pulse value when the current is the locked rotor amperes and above the clock pulse value when the current is the full load amperes in order to bias diode 118 to pass a clock pulse during locked rotor ampere conditions and block clock pulses during full load ampere conditions.

Thus, in operation, starting of the system is effected by the first clock pulse from diode 117 being applied to the set input 99 to start the compressor motor. Reed switch 123 vibrates open and closed during the initial inrush of current to the compressor motor but should remain open before the next clock pulse so as to prevent applying an input signal to the Reset input 101. If the motor does not start, however, reed switch 123 continues to vibrate open and closed one second after the attempted motor start and the clock pulse from diode 118 is applied to Reset input 101 to turn flip-flop 91 off and thereby disconnect the compressor motor.

It should be noted that any time the compressor current rises to a value sufficient to vibrate reed switch 123 open and closed, such as during running of the motor, a clock pulse from diode 118 immediately resets flip-flop 91 to terminate operation of the motor and a three-minute restart cycle immediately initiated.

Thus, the circuitry illustrated in FIG. 5a provides improved protection of the system from a number of electrical faults without hindering normal operation of the system. By permitting operation through transient conditions having a duration that would not cause permanent damage to the system without shutting down the system, improved stability of operation is obtained. On the other hand, by assuring that the system is shut down and prevented from restarting until sufficient time has elapsed to prevent damage upon restarting, improved long life and minimum maintenance requirements are obtained.

Referring now to FIG. 5b of the drawing, the temperature control portion of the circuitry may be seen in greater detail. The low temperature circuit 47 is connected to a temperature sensor $T_{LO}$ including NTC thermistor 51 and the high temperature circuit 46 is connected to temperature sensor $T_{HI}$ including an NTC thermistor 50. Temperature sensor $T_{HI}$ is attached to the condenser current return bend as discussed briefly above, and temperature sensor $T_{LO}$ is attached to the compressor suction line as discussed above. Ilustratively $T_{HI}$ is calibrated so that at a temperature of 145° F the ratio of the voltage $E_H$, measured at the connection of thermistor 50 and trimming resistor 133, to the 5-volt supply $E_{5R}$ on line 135 equals 0.5 ($E_H/E_{5R} = 0.5$ at 145° F). Above 145° F., $E_H$ continues to increase. Temperature sensor $T_{LO}$ is calibrated so that a temperature of 32° F. the ratio of the voltage $E_L$, measured at the connection of thermistor 51 and trimming resistor 132, to the 5-volt supply $E_{5R}$ on line 135 equals 0.25 ($E_L/E_{5R} = 0.25$ at 32° F). Below this temperature, $E_L$ continues to decrease. Thermistor 51 is calibrated by a trimming resistor 132 and thermistor 50 is calibrated by a trimming resistor 133. The trimming resistors may be carried on the same substrate with their respective thermistors. Thus, the combination of thermistor and trimming resistor may be used interchangeably in different controls as a common readily substituted component. The voltage output of temperature sensor $T_{LO}$ is compared with a reference voltage in comparator 134. The reference voltage for comparator 134 is applied from a 5-volt power supply on line 135 through a voltage divider circuit comprising a 47 kilohm resistor 136 and a 15 kilohm resistor 137 to the (−) input 138 of comparator 134. The voltage output of temperature sensor $T_{HI}$ is likewise compared with a reference voltage in comparator 139. A reference voltage is applied to a comparator 139 (+) input 140 from the 5-volt power supply on line 135 through a voltage divider network including a 15 kilohm resistor 141, a 15 kilohm resistor 142, and through a 10 kilohm resistor 143.

Comparator 134 allows a clock pulse from clock pulse supply 112 to be fed through a diode 144, a 0.01 microfarad condensor 145 and a 10 kilohm resistor 146 to the Set input 147 of a flip-flop 148 when the temperature sensed by the $T_{LO}$ sensor drop below the calibrated low temperature as discussed above. The clock pulses are prevented from being applied to input 147 whenever the temperature sensed by the $T_{LO}$ sensor is above the low temperature calibration.

Comparator 139 allows a clock pulse from clock pulse supply 112 to be fed through a diode 149, a 0.01 microfarad condensor 150, and a diode 151 to be applied through resistor 146 to input 147 of flip-flop 148 and through a diode 152 and a 10 kilohm resistor 153 to the Set input 154 of a second flip-flop 155 when the temperature sensed by the $T_{HI}$ sensor above the calibrated high temperature. The clock pulses are prevented from being applied to inputs 147 and 154 whenever the temperature sensed by the $T_{HI}$ sensor is below the high temperature calibration.

The Reset inputs 158 and 159 of flip-flop 148 and 155, respectively, are provided with small reference voltages from 12-volt supply 68 through voltage divider networks. Thus, the voltage divider network of flip-flop 148 includes a 220 kilohm resistor 160 and a 10 kilohm resistor 161, and the voltage divider network of flip-flop 155 includes a 220 kilohm resistor 162 and a 10 kilohm resistor 163. The resetting of the flip-flops 148 and 155 is effected either by the opening of the thermostat switch 35 or by moving the selector switch 32 from "Cool" to "Off". The power-up condition of the flip-flops 148 and 155 provides a low output to control buffers 49 and 48 respectively comprising transistors 164 and 165, respectively, which, in turn, control signal lamps 27 and 28, respectively, connected to the collectors 164c and 165c of transistors 164 and 165 through 2.2 kilohm resistors 166 and 167, respectively. As shown, emitter 164e of transistor 164 and emitter 165e of transistor 165 are connected to common 60 so that when the flip-flop outputs are high, the NPN transistor collector is low, energizing the lamps 27 or 28, respectively. Signals are provided to flip-flop 91 through diodes 95 and 96 from transistors 165 and 164, respectively, when the respective flip-flop 155 or 148 output is high to force the output of flip-flop 91 low causing electronic switch 34 to deenergize contactor coil 37. The freeze and overheat temperatures sensed by thermistors 50 and 51 are checked every clock pulse, i.e., once each second, when the air conditioning system is operating.

Thus, when a low temperature condition is sensed by the $T_{LO}$ sensor, a clock pulse is delivered to input 147 of flip-flop 148, turning on lamp 27 and when a high temperature condition is sensed by the $T_{HI}$ sensor, a clock pulse is transmitted to both Set input 147 of flip-flop 148 and Set input 154 of flip-flop 155 to illuminate both lamps 27 and 28. Flip-flop 148 and/or 155 concurrently cause deenergization of the air conditioning system by forcing the output of flip-flop 91 low.

Comparator 134 output is connected to 12-volt power supply 68 through a 10 kilohm resistor 168 and to diode 144 through a 1 megohm resistor 169. The output of comparator 139 is connected to 12-volt power supply 68 through a 10 kilohm resistor 170 and to diode 149 through a 1 megohm resistor 171. The output of comparator 134 goes low when the thermistor 51 temperature is below the preselected low temperature and the output of comparator 139 goes low when the temperature of thermistor 50 is above the preselected high temperature. Thus, the normal mode of comparator outputs is a high output so as to bias diodes 144 and 149 to prevent clock pulses from being fed to the flip-flop Set inputs 147 and 154. In each instance, an increase in the output voltage from the temperature sensor is obtained from an increase in the second temperature. As shown in FIG. 5b, the output from the $T_{LO}$ sensor is connected through a 10 kilohm resistor 172 to the (+) input 173 of comparator 134 and the output of the $T_{HI}$ sensor is connected to the (−) input 174 of comparator 139 through a 10 kilohm resistor 175. A 1 megohm resistor 176 is connected from 5-volt power supply lead 135 to input 174. A 100 kilohm resistor 177 is connected to the $T_{LO}$ sensor and common 60. Input 173 is further connected through a diode 178 to a voltage divider including a 10 kilohm resistor 179 and a 100 kilohm resistor 180 connected between the 12-volt power supply lead 68 and common 60. A 10 megohm resistor 181 is connected between the output of comparator 134 and input 173 thereof to provide voltage hysteresis for input 173. A 1 kilohm resistor 182 is connected between resistor 146 and common 60. A 120 kilohm resistor 183 is connected between flip-flop input 147 and the output thereof to provide a latching feedback loop. A 10 kilohm output pullup resistor 225 is connected between resistor 183 and 12-volt power supply lead 68. A 47 kilohm resistor 184 is connected between the output of flip-flop 148 and the base 164b of transistor 164. A 0.001 microfarad condensor 185 is connected between the output of flip-flop 148 and common 60, and a 0.001 microfarad condenser 186 is connected between the base 164b of transistor 164 and common 60 to filter noise.

A 10 megohm resistor 187 is connected between the output of comparator 139 and input 140 thereof to provide voltage hysteresis for input 140. A diode 188 is connected to input 140 and to a voltage divider including a 10 kilohm resistor 189 and a 100 kilohm resistor 190 connected between the 12-volt supply lead 68 and common 60.

Diode 152 is connected through a 1 kilohm resistor 191 to common 60 and input 154 of flip-flop 155 is connected through a 120 kilohm resistor 192 to the output of the flip-flop to provide a latching feedback loop. The flip-flop output is further connected through a 10 kilohm pullup resistor 193 through power supply lead 68 and through a 0.001 microfarad noise filter condenser 194 to common 60.

The output of flip-flop 155 is connected through a 47 kilohm resistor 195 to the base 165b of transistor 165 which, in turn, is connected through a 0.001 microfarad noise filter condenser 196 to common 60 to complete the circuit structure of circuit portions 46, 47, 48 and 49.

As the temperature sensing comparator input circuits are powered from the 5-volt supply 135, the voltage across the thermistors is almost zero when the flip-flop 91 output is low to place the air conditioning system in the "Off" condition. Under these conditions, the inputs 173 and 140 of comparators 134 and 139 are fed voltage from the 12-volt power supply 68 through diodes 178 and 188, respectively, holding the outputs of the comparators high and preventing any temperature clock pulses from reaching the flip-flops 148 and 155 thus conditioning the comparators 134 and 139 to ignore temperature conditions whenever flip-flop 91 output is low. Thus, initiation of the operation of the air conditioning circuit is effected before temperature logic measurements are made by the control. The voltage applied through diodes 178 and 188 is caused to be less than the lowest reference resistance ratio used to prevent adverse effects on calibration of the temperature sensing circuits. Resistor 177 and resistor 176 are provided to cause a low temperature indication to flip-flop 148 in the event the $T_{LO}$ sensor is disconnected from the system and a high temperature indication to flip-flop 155 if the $T_{HI}$ sensor is disconnected, thereby providing a fail-safe arrangement of the control. These two resistors are sized to be substantially greater than the resistances of the high and low temperature voltage divider networks to have minimum effect on the calibration of the control.

Thus, indicator lamps 27 and 28 show a normal operation when they are both extinquished. Illumination of signal lamp 27 without illumination of signal lamp 28 indicates a low temperature or "freeze" condition. Illumination of both lamps 27 and 28 indicates an overheat condition, and illumination lamp 28 without illumination of lamp 27 indicates a No-Cool condition. Signal lamp 26 is also illuminated when the operation of the apparatus is interrupted by a freeze, an overheat, or a No-Cool condition. Illumination of signal lamp 26 alone provides an indication of an electrical circuit problem and further indicates the one-second delay on normal start.

No-Cool circuit 45 allows a clock pulse from supply 112 to be fed through a diode 156 and 0.01 microfarad condenser 157 to resistor 153 to Set input 154 of flip-flop 155 after a No-Cool condition has continued uninterrupted for a 7 minute period. The No-Cool circuit includes a pair of comparators 197 and 198. A 7 minute R-C time delay circuit is provided including a 22 microfarad condenser 199 and a 10 megohm resistor 200 connected to common 60. The (−) input 201 of comparator 197 is connected to a voltage divider network including a 47 kilohm resistor 202 connected to 5 volt power supply 135 and a 15 kilohm resistor 203 connected to common 60.

The (+) input 204 of comparator 197 is connected through a 10 kilohm 205 to voltage $E_H$ at the output of senser $T_{HI}$ and through a 10 megohm resistor 206 to the output 207 of comparator 197. Resistor 206 provides voltage hysteresis for input 204. The output is further connected through a 33 kilohm pullup resistor 208 to the 5-volt power supply 135 and to a diode 209. The diode, in turn, is connected to a voltage divider network including a 15 megohm resistor 210 connected to the 5-volt power supply 135 and a 15 kilohm resistor 211 connected to common 60.

The (−) input 212 of comparator 198 is connected through a 10 kilohm resistor 213 to voltage $E_L$ at the output of senser $T_{LO}$ and the (+) input 214 of comparator 198 is connected through a 10 kilohm resistor 215 to diode 209. Input 214 is further connected through a diode 216 to a voltage divider network including a 10 kilohm resistor 217 connected to common 60 and a 100 kilohm resistor 218 connected to 12-volt power supply lead 68.

Comparator input 214 is connected through a 10 megohm resistor 219 to comparator output 220 to provide voltage hysteresis and through a 10 kilohm pullup resistor 221 to 12-volt power supply 68.

A diode 222 is connected from comparator output 220 to condenser 199 and through a 1 megohm resistor 223 to an interconnecting lead 224 connecting the No-Cool circuit 45 through the condenser 157 of the high temperature circuit 46 to apply clock pulses to input 154 of flip-flop 155 under the control of the No-Cool circuit.

As discussed above, the temperature sensing input circuits are powered from the 5 volt supply 135, thus the voltage in these circuits is almost zero when the flip-flop 91 output is low. In this condition the input 214 of comparator 198 is fed voltage from the 12-volt power supply 68 through diode 216, holding the output of comparator 198 high. With comparator 198 output 220 high, condenser 199 charges rapidly from the 12-volt power supply 68 through resistor 221 and diode 222 so that a full charge is obtained prior to the provision of the first clock pulse from supply 112 and diode 156. Normally upon starting of the air conditioning system, the $T_{LO}$ temperature is above 80° F. so that the output 220 of comparator 198 goes low initiating the voltage decay of the R-C circuit. The R-C decay is set for a 7 minute timing function before a clock pulse is delivered through diode 156 to condensor 157 to effect a shutoff of the system from the No-Cool circuit portion. Under normal conditions, the air conditioning system cools the $T_{LO}$ sensor sufficiently (i.e., to a temperature below 80° F. ) before the end of the 7 minute period to permit comparator 198 to go high thereby maintaining condenser 199 fully charged so as to prevent the No-Cool circuit clock pulse from being delivered to condenser 157 and, thus, flip-flop 155 does not terminate the operation of the air conditioning system.

However, if the air conditioning system should fail to cool during operation thereof, the output 220 of comparator 198 goes and/or stays low and after the 7-minute delay control by the R-C circuit 199, 200, the No-Cool circuit 45 shuts off the flip-flop 155. The failure to cool may be the result of a gradual or abrupt loss of refrigerant, failure of the compressor, or failure of the contactor by way of example only. The actual mode of failure is immaterial since the No-Cool circuit looks at the system performance to decide if the system is cooling. The location of the $T_{LO}$ sensor on the suction adjacent the compressor shell insures that a No-Cool condition will result in $T_{LO}$ sensing a temperature above 80° F. since the $T_{LO}$ sensor receives heat from the compressor motor and crankcase heater when the refrigerant flow is either low or non-existent in the suction line as will be the case if the air conditioner is not cooling.

The control temperature of the comparator 98 with respect to the $T_{LO}$ sensor is automatically shifted from 80°F to 90° F in the event the temperature sensed by the $T_{HI}$ sensor is above 90° F. The comparator 197 output 207 is high when the $T_{HI}$ sensor senses a temperature above 90° F thus feeding additional voltage to resistor 215 from the 5 volt supply 135 and resistor 208 through diode 209. Thus, under high humidity conditions and the like, the air conditioner continues to operate although a high load condition exists.

Thus, in operation, upon energization of the electronic switch and power supply 34, flip-flops 148 and 155 power up with their respective outputs low, and comparators 134, 139, 197 and 198 power up high inasmuch as flip-flop 91 has powered up low causing the 5-volt supply 135 to be low. Condenser 199 is charged due to the output of comparator 198 being high thus setting the 7 -minute No-Cool time delay. Assuming the air conditioner starts and runs the temperature monitoring of the system commences. During the initial 7 minutes of operation, so long as the $T_{LO}$ senser senses temperatures above the freeze point (28° F) and the $T_{HI}$ sensor senses temperatures below the overheat temperature (145° F) comparators 134 and 139 remain high thus blocking clock pulses from flip-flop 148 and/or 155. If sensor $T_{LO}$ senses a temperature below the freeze temperature, comparator 134 goes low thus allowing the next clock pulse to feed to flip-flop 148 causing it to go high. Feedback resistor 183 latches flip-flop 148 high. When flip-flop 148 goes high, transistor 164 is turned on illuminating indicator 27 and forcing the output of flip-flop 91 low thus de-energizing the contactor coil 37 and stopping the air conditioner. The low voltage supply to the electronic switch and power supply must be interrupted to reset control 23 by turning off the 12 -volt supply. The low voltage supply may be interrupted by switching selector switch 32 from the Cool"to "Off"setting and returning the switch to the "Cool"setting. Likewise, the thermostat 35 can be manually opened and reclosed to interrupt the low voltage supply to the control. However, as discussed above, the air conditioner must remain off a minimum of 3 minutes because of the restart delay circuit 39.

Similarly, if sensor $T_{HI}$ senses a temperature above the overheat temperature, comparator 139 goes low thus allowing the next clock pulse to feed to flip-flops 148 and 155 causing them to go high. When flip-flops 148 and 155 go high, indicators 27 and 28 are illuminated and the output of flip-flop 91 is forced low stopping the air conditioner. As before, the control must be reset by interrupting the low voltage supply.

So long as the temperature sensed by sensor $T_{LO}$ is below 80° F (90° F under heavy loads), the comparator 198 is high maintaining a full charge on condenser 199. If the system is operating properly, the temperature sensed by $T_{LO}$ will drop below 80° F before 7 minutes expires unless a heavy load is encountered ($T_{HI}$ sensing a temperature above 90° F) in which case $T_{LO}$ need drop only below 90° F. If, for any reason as discussed above, the $T_{LO}$ sensor senses a temperature above 80° F (90° F under heavy loads), comparator 198 will go low permitting condenser 199 to discharge through resistor 200. If the abnormal temperature persists, without interruption, for 7 minutes, the bias on diode 156 will drop to the point where a clock pulse is allowed to feed flip-flop 155 causing it to go high. As above, when flip-flop 55 goes high, transistor 165 is turned on illuminating indicator 28 and forcing flip-flop 91 low thus stopping the air conditioner. Further, as above, the control must be reset by interrupting the low voltage supply.

Thus, not only does control 23 deenergize the contactor coil 37 upon sensing of $T_{LO}$, $T_{HI}$ or No-Cool conditions to protect the compressor, these abnormal conditions are latched requiring manual reset. By requiring manual reset, the homeowner is advised that the air conditioning system needs attention, and further, what portion of the system is involved.

For completeness in the disclosure of the above-described system, but not for purposes of limitation, the following component identifications are submitted. Those skilled in this art will recognize that alternative components and alternate component values to those described above may be employed in constructing systems and circuits in accordance with the present invention. Indeed, even though the herein set out system and circuit are presently considered the best mode of practicing the invention, the inventors may themselves decide, after further experiments and experience or for differing environments of use, to make modifications and changes.

| PART | TYPE |
|---|---|
| Diodes 53, 54, 55, 56, 58, 61, 78, 83, 95, 96, 117, 118, 130, 131, 144, 149, 151, 152, 156, 178, 188, 209, 216 and 222 | Semtech SI-2 |
| Transistors 92, 164 and 165 | Motorola MPS-5172 |
| PUT 109 | 2N6027 |
| SCR 57 | Motorola MCR 407-4 |
| Light Emitting Diodes 26, 27, 28 and 84 | General Electric SSL-22L |
| Comparators 82, 134, 139, 197 and 198 | ¼ of a Motorola MC-3302P integrated circuit |
| Flip-flops 91, 148 and 155 | ¼ of a Motorola MC-3302P integrated circuit |

While efforts have been made to accurately record and transcribe the values of the components herein, it is, of course, possible that one or more errors may have inadvertently crept into this compilation. To guard against these, the reader is cautioned to employ the well-known methods to mathematically and experimentally verify the above.

Thus, control 23 is provided with indicator lights 26, 27 and 28. Light 26 is connected to the control flip-flop 40 and indicates, when illuminated, that the control 23 is energized but that the control flip-flop is prevented from energizing the electronic switch 34 until the 3 minute delay time by delay circuit 39 has elapsed. Indicator lights 27 and 28 are connected to the low temperature circuit 47 and the high temperature 46 respectively. No-Cool circuit 45 is also connected to the high and low temperature circuits so that when light 27 is illuminated with light 26, a freeze-up malfunction is indicated; when lights 27 and 28 are illuminated with light 26, an overheat malfunction is indicated and when light 28 is illuminated with light 26, a NO-Cool malfunction is indicated.

When one or more of the indicator lights 27 and 28 are illuminated with light 26, the control flip-flop 40 has caused the electronic switch 34 to be de-energized as a result of the low temperature circuit 47 and/or high temperature circuit 46 and/or No-Cool circuit 45 forcing the output of control flip-flop 40 low. Control flip-flop 40 remains with its output low until the control 23 is manually reset inasmuch as the temperature sensing circuit causing the control flip-flop 40 output to go low stays in the condition forcing the output low until reset. The control is reset by moving switch 32 to the "Off" position, thus disconnecting control 23 from the power source, and then returning switch 32 to the "Cool" position. The temperature sensing circuits power up in a condition whereby they do not force the output of control flip-flop 40 low, thus permitting the control to restart the compressor provided that the 3 minute delay period has elapsed.

Thus, control means 23 provides an improved controlled operation of an air conditioning system, such as air conditioning system 10. The control provides a number of highly desirable features not found in the controls of the prior art. The control utilizes highly simplified external wiring and low cost components so as to be extremely simple and economical of construction while yet providing the highly desirable improved functioning.

The control is arranged to provide automatic restarting of the system without the need for operator restarting where the cause of the interruption in the operation of the system is a self-clearing electrical problem, while requiring that manual reset be effected by the user where temperature conditions have caused the interruption, thereby advising elimination of the cause of the temperature problem before restarting of the system.

The control is also provided with indicator lights to advise an observer whether the air conditioner is off or running normally (all lights off), whether the air conditioner is off and will try to start when the 3 minute delay period has elapsed (light 26 illuminated) and thus requires no action by the observer, whether the air conditioner is not running as a result of a freeze-up malfunction (lights 26 and 27 illuminated), an overheat malfunction (lights 26, 27 and 28 illuminated) or a No-Cool malfunction (lights 26 and 28 illuminated) advising correction of the malfunction and manual resettting of the control.

The foregoing disclosure of specific embodiment is illustrative of the broad inventive concepts comprehended by the invention.

Having described the invention, the embodiments of the invention in which an exclusive property or privilege is claimed are defined as follows:

1. In a control system for an air conditioner refrigerant compressor comprising:
a control means for controlling connection of said compressor to an electrical power source; a sensing means connected to said control means for monitoring the voltage of said source and current flow from said source to said compressor, said sensing means being arranged to prevent said control means from energizing said compressor when said source voltage is below a preselected minimum and said sensing means being arranged to cause said control means to deenergize said compressor when said current flow to said compressor exceeds a preselected maximum;

a time delay means connected to said control means for delaying operation of said control means to connect said compressor to said power source for a predetermined period of time upon each de-energization of said compressor and upon each occurrence of a voltage below said preselected minimum voltage;

a temperature sensing means arranged to monitor air conditioner operating temperature conditions, said temperature sensing means being connected to said control means to cause said control means to de-energize said compressor upon the occurrence of temperatures beyond one or more preselected levels until said control means is manually reset; and a manual reset means connected between said power source and said control system for permitting said control means to connect said compressor to said power source after said predetermined period of time has elapsed;

the improvement comprising first indicator means connected to said control means and arranged to provide an indication that said control system is energized but that said control means is prevented from energizing said compressor until said predetermined period of time has elapsed; and second indicator means connected to said temperature sensing means and arranged to provide an indication that said temperature sensing means has determined a temperature beyond one or more of said preselected levels and that said control means must be reset by said manual reset means.

2. The control system of claim 1 further including a wall-mounted thermostat for controlling operation of the air conditioner wherein said first and second indicator means are positioned adjacent said thermostat.

3. The control system of claim 2 wherein said manual reset means includes a manually operable switch adjacent the thermostat for selectively providing electrical power to said control system.

4. The control system of claim 1 wherein said second indicator means comprises a plurality of indicators responsive to a plurality of different preselected temperature levels.

5. The control system of claim 1 wherein said temperature sensing means includes low temperature circuit means for determining a freeze-up condition of the evaporator of said air conditioner and wherein said second indicator means includes first and second indicators, whereby when said low temperature circuit means determines a freeze-up condition, said control means de-energizes said compressor and causes said first indicator means to give its indication and said low temperature circuit means causes said first indicator of said second indicator means to give its indication thus advising an observer that said air conditioner is not operating because of an evaporator freeze-up condition and that said control system must be manually reset by operating said manual reset means upon correction of the malfunction causing said freeze-up condition.

6. The control system of claim 1 wherein said temperature sensing means includes high temperature circuit means for determining an overheat condition of the condenser of said air conditioner and wherein said second indicator means includes first and second indicators, whereby when said high temperature circuit means determines an overheat condition said control means de-energizes said compressor, and causes said first indicator means to give its indication and said high temperature circuit means causes said first and second indicators of said second indicator means to give their respective indications thus advising an observer that said air conditioner is not operating because of a condenser overheat condition and that said control system must be manually reset upon correction of the malfunction causing said overheat condition.

7. The control system of claim 1 wherein said temperature sensing means includes No-Cool circuit means for determining that said air conditioner is not cooling air and wherein said second indicator means includes first and second indicators, whereby when said No-Cool circuit means determines a No-Cool condition said control means de-energizes said compressor and causes said first indicator means to give its indication and said No-Cool circuit means causes said second indicator of said second indicator means to give its indication thus advising an observer that said air conditioner is not operating because of a No-Cool condition and that said control system must be manually reset upon correction of the malfunction causing said No-Cool condition.

8. In a control system for an air conditioner refrigerant compressor comprising: a control means for controlling connection of said compressor to an electrical power source; a condition sensing means connected to said control means for monitoring operating conditions of said air conditioner, said condition sensing means being arranged to cause said control means to de-energize said compressor upon the occurrence of undesirable operating conditions beyond one or more preselected levels until said control means is manually reset; a manual reset means connected between said power source and said control system for permitting said control means to connect said compressor to said power source; and indicator means connected to said condition sensing means and arranged to provide an indication to an observer that said control system is energized but that said control means is prevented from energizing said compressor because of the occurrence of such an undesirable operating condition and that said control means must be reset by said manual reset means to effect further operation of the air conditioner.

9. The control system of claim 8 further including a wall-mounted thermostat for controlling operation of the air conditioner wherein said indicator means and said manual reset means are positioned adjacent said thermostat.

10. The control system of claim 8 further including a time delay means connected to said control means for delaying operation of said control means to connect said compressor to said power source for a predetermined period of time upon each de-energization of said compressor wherein said manual reset means permits said control means to connect said compressor to said power source after said predetermined period of time has elapsed.

11. The cooling system of claim 8 wherein said condition sensing means comprises temperature sensing means arranged to monitor air conditioner operating temperature conditions.

12. In a control system for an air conditioner refrigerant compressor comprising: a control means for controlling connection of said compressor to an electrical power source; a first condition sensing means connected to said control means for monitoring operating conditions for said compressor, said first codition sensing means being arranged to cause said control means to prevent compressor operation when said first condition sensing means determines that said operating conditions are beyond one or more preselected levels; a time delay means connected to said control means for delaying operation of said control means to connect said compressor to said power source for a predetermined period of time upon each de-energization of said compressor and upon each occurrence of a compressor operating condition beyond said one or more preselected levels; a second condition sensing means connected to said control means for monitoring operating conditions of said air conditioner, said second condition sensing means being arranged to cause said control means to de-energize said compressor upon the occurrence of operating conditions beyone one or more preselected levels until said control means is manually reset; a manual reset means connected between said power source and said control system for permitting said control means to connect said compressor to said power source after said predetermined period of time has elapsed; first indicator means connected to said control means and arranged to provide an indication that said control system is energized but that said control means is prevented from energizing said compressor until said predetermined period of time has elapsed; and second indicator means connected to said second condition sensing means and arranged to provide an indication that said second condition sensing means has determined a condition beyond one or more of said preselected levels and that said control means must be reset by said manual reset means.

13. The control system of claim 12 further including a wall-mounted thermostat for controlling operation of the air conditioner wherein said first and second indicator means are positioned adjacent said thermostat.

14. The control system of claim 12 further including a wall-mounted thermostat for controlling operation of the air conditioner wherein said first and second indicator means and said manual reset means are positioned adjacent said thermostat.

15. In a control system for an air conditioner refrigerant compressor comprising:
  an electronic switch means for controlling connection of said compressor to an electrical power source;
  a voltage sensing means for determining whether the voltage of said power source is below a preselected minimum voltage;
  a control means for controlling energization of said electronic switch means;
  a time delay means connected to said control means, said electronic switch means and said voltage sensing means for delaying energization of said electronic switch means by said control means for a predetermined period of time as an incident of each de-energization of said electronic switch means and as an incident of each determination of a voltage below said preselected minimum voltage;
  a current sensing means arranged to determine the existence of compressor current above a preselected level, said current sensing means being connected to said control means whereby occurrence of compressor current above said preselected level longer than a preselected interval causes said control means to de-energize said electronic switch means;
  a temperature sensing means including a low temperature circuit means for determining a freeze-up condition of the evaporator of said air conditioner, a high temperature circuit means for determining an overheat condition of the condenser of said air conditioner, an a No Cool circuit means for determining that said air conditioner is not cooling air, whereby when any of said low temperature circuit means, said high temperature circuit means and said No-Cool circuit means determines a temperature beyond respective preselected levels, said temperature sensing means causes said control means to de-energize said electronic switch means until said control system is manually reset;
  a manual reset means connected between said power source and said control system for permitting said control means to connect said compressor to said power source after said predetermined period of time has elapsed; a first indicator light connected to said control means and arranged to be illuminated when said control system is energized but that said control means is prevented from energizing said electronic switch means until said predetermined period of time has elapsed; and second and third indicator lights connected to said temperature sensing means and arranged so that said second indicator light is illuminated when said low temperature circuit has caused said control means to de-energize said electronic switch means, and so that said second and third indicator lights are illuminated when said high temperature circuit has caused said control means to de-energize said electronic switch, and so that said third indicator light is illuminated when said No-Cool circuit has caused said control means to de-energize said electronic switch means, thus advising an observer that when only the first indicator light is illuminated, that said air conditioner is not operating but that the compressor will be energized upon the lapse of said predetermined period of time, that when said first indicator light is illuminated together with said second indicator light, said second and third indicator lights or said third indicator light that said air conditioner is not operating because of a freeze-up, overheat or No-Cool malfunction respectively and that said control system must be manually reset by operating said manual reset means upon correction of the indicated malfunction thereby permitting said control means to energize said electronic switch means upon the lapse of said predetermined period of time.

16. The control system of claim 15 further including a wall-mounted thermostat for controlling operation of the air conditioner wherein said first, second and third indicator lights and said manual reset means are positioned adjacent said thermostat.

17. In a control system for an air conditioner refrigerant compressor comprising: a control means for controlling connection of said compressor to an electrical power source; a first condition sensing means connected to said control means for monitoring operating conditions for said compressor, said first condition sensing means being arranged to cause said control means to prevent compressor operation when said first condition sensing means determines that said operating conditions are beyond one or more preselected levels; a second condition sensing means connected to said control means for monitoring operating conditions of said air conditioner, said second condition sensing means being arranged to cause said control means to de-energize said compressor upon the occurrence of undesirable operating conditions beyond one or more preselected levels until said control means is manually reset; a manual reset means connected between said power source and said control system for permitting said control means to connect said compressor to said power source after said predetermined period of time has elapsed; first indicator means connected to said control means and arranged to provide an indication that said control system is energized but that said control means is prevented from energizing said compressor; and second indicator means connected to said second condition sysensing means and arranged to provide an indication that said control system is energized but that said control means is prevented from energizing said compressor because said second condition sensing means has determined a condition beyond one or more of said preselected levels and that said control means must be reset by said manual reset means.

* * * * *